US008357626B2

(12) United States Patent
Machida et al.

(10) Patent No.: US 8,357,626 B2
(45) Date of Patent: Jan. 22, 2013

(54) OXYGEN STORAGE/RELEASE MATERIAL AND EXHAUST GAS PURIFYING CATALYST COMPRISING THE SAME

(75) Inventors: Masato Machida, Kumamoto (JP); Keita Ikeue, Kumamoto (JP); Masahide Miura, Toyota (JP)

(73) Assignees: National University Corporation Kumamoto University, Kumamoto (JP); Toyota Jidosha Kabushiki Kaisha, Toyota (JP)

( * ) Notice: Subject to any disclaimer, the term of this patent is extended or adjusted under 35 U.S.C. 154(b) by 454 days.

(21) Appl. No.: 12/451,387

(22) PCT Filed: May 19, 2008

(86) PCT No.: PCT/JP2008/059593
§ 371 (c)(1),
(2), (4) Date: Nov. 10, 2009

(87) PCT Pub. No.: WO2008/143350
PCT Pub. Date: Nov. 27, 2008

(65) Prior Publication Data
US 2010/0130350 A1 May 27, 2010

(30) Foreign Application Priority Data
May 21, 2007 (JP) ................................. 2007-134191

(51) Int. Cl.
*B01J 27/043* (2006.01)
*B01J 27/053* (2006.01)
(52) U.S. Cl. ........ 502/222; 502/216; 502/217; 502/223; 423/263
(58) Field of Classification Search .................. 502/216, 502/217, 222, 223; 423/263
See application file for complete search history.

(56) References Cited

U.S. PATENT DOCUMENTS

| | | | |
|---|---|---|---|
| 5,795,554 | A | 8/1998 | Fang et al. |
| 6,287,527 | B1 | 9/2001 | Kawanami et al. |
| 6,296,824 | B1 | 10/2001 | Leppert |
| 6,355,220 | B1 | 3/2002 | Blanchard et al. |
| 6,806,225 | B1 | 10/2004 | Ikeda et al. |
| 6,808,687 | B1 | 10/2004 | Uenishi et al. |
| 2004/0198595 | A1 | 10/2004 | Chen |
| 2008/0000222 | A1 | 1/2008 | Hirata |

FOREIGN PATENT DOCUMENTS

| | | |
|---|---|---|
| DE | 100 24 994 A1 | 1/2001 |
| EP | 1 046 423 A2 | 10/2000 |
| EP | 1 127 605 A2 | 8/2001 |
| JP | A-05-208816 | 8/1993 |
| JP | A-07-213902 | 8/1995 |
| JP | A-10-174866 | 6/1998 |
| JP | A-11-267504 | 10/1999 |
| JP | A-11-292538 | 10/1999 |
| JP | A-11-322339 | 11/1999 |
| JP | A-2002-11350 | 1/2002 |
| JP | A-2004-28041 | 1/2004 |
| JP | A-2004-100626 | 4/2004 |
| JP | A-2005-87892 | 4/2005 |
| JP | A-2006-75716 | 3/2006 |
| WO | WO 95/35152 A1 | 12/1995 |
| WO | WO 2006/027976 A1 | 3/2006 |

OTHER PUBLICATIONS

U.S. Appl. No. 12/448,501, filed Jun. 23, 2009 in the name of Machida et al.
International Search Report issued on Oct. 22, 2008 in International Application No. PCT/JP2008/059502.
May 24, 2010 Office Action issued in U.S. Appl. No. 11/659,535.
International Search Report for Application No. PCT/JP2008/059593, issued Aug. 22, 2008.
Jan. 27, 2011 Office Action issued in U.S. Appl. No. 11/659,535.
International Search Report issued on Dec. 23, 2005 in International Application No. PCT/JP2005/015835.
United States Office Action issued on Feb. 9, 2010 in U.S. Appl. No. 11/659,535 in the name of Hirata.
U.S. Appl. No. 11/659,535, filed Feb. 6, 2007 in the name of Hirata.
Nov. 16, 2011 Chinese Office Action issued in Chinese Patent Application No. 200880016860.7 (with translation).
Ikeue et al., "Large-capacity oxygen storage of Pd-loaded $Pr_2O_2SO_4$ applied to anaerobic catalytic CO oxidation," Journal of Catalysis, vol. 248, No. 1, pp. 46-52, 2007.
Feb. 17, 2012 Office Action issued in U.S. Appl. No. 12/448,501.
M. Machida et al., "LN Dependence of the Large-Capacity Oxygen Storage/Release Property of Ln Oxysulfate/Oxysulfide Systems", Chemistry of Materials, vol. 19, Issue 4, pp. 954-960, Publication Date (Web): Jan. 24, 2007.
Jun. 1, 2012 Office Action issued in U.S. Appl. No. 12/448,501.

*Primary Examiner* — Elizabeth Wood
(74) *Attorney, Agent, or Firm* — Oliff & Berridge, PLC

(57) ABSTRACT

There is provided an oxygen storage/release material using a rare earth oxysulfate or oxysulfide, which has a high oxygen storage/release capacity even at lower temperatures. The oxygen storage/release material of the present invention comprises a compound consisting of $Pr_2O_2SO_4$ and/or $Pr_2O_2S$ and at least one metal selected from the group consisting of Pt, Rh and Fe supported thereon.

2 Claims, 1 Drawing Sheet

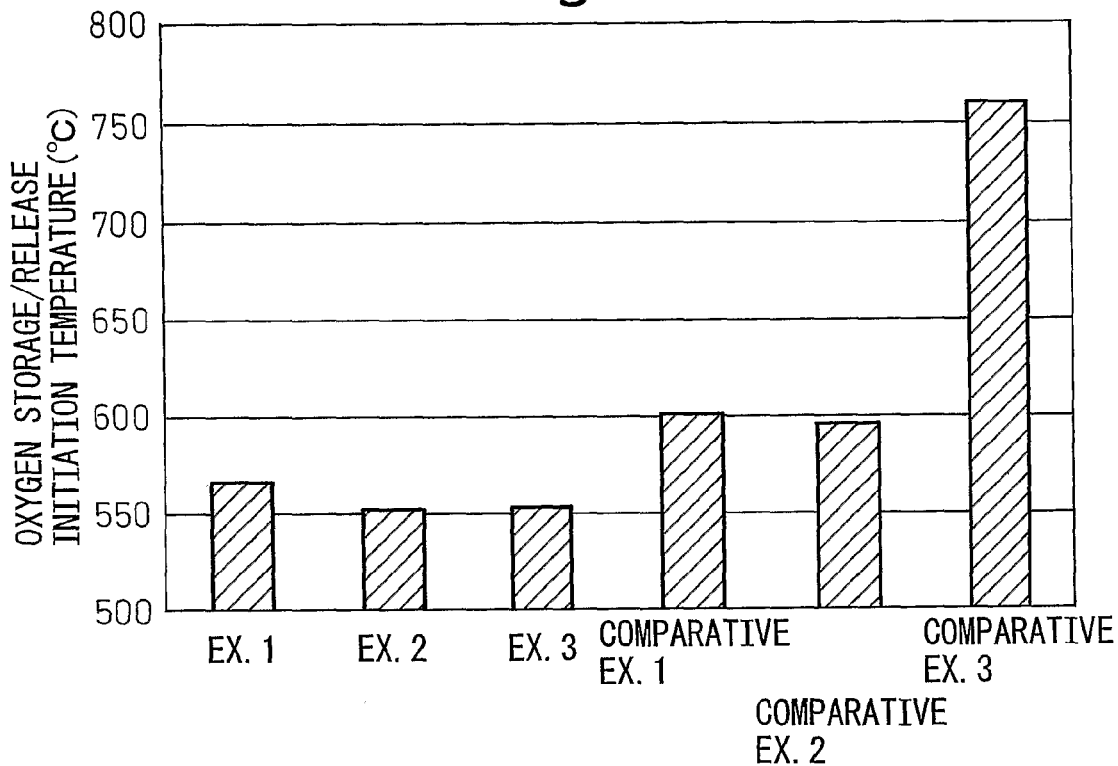
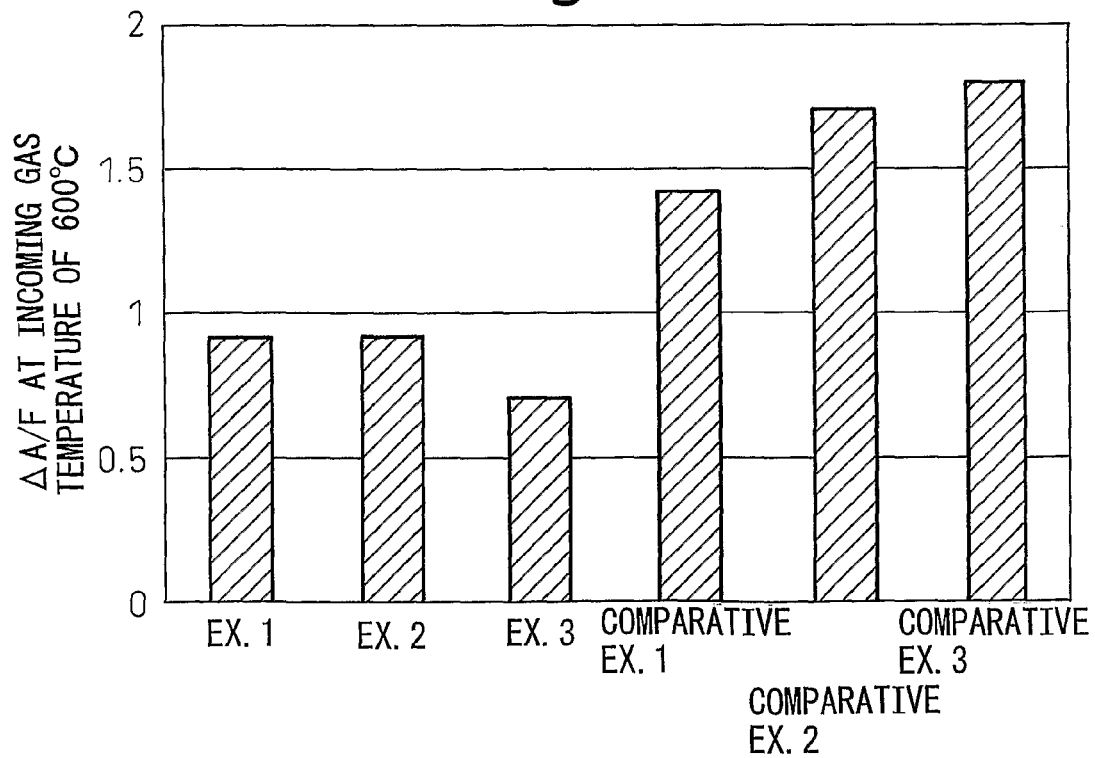

OXYGEN STORAGE/RELEASE MATERIAL AND EXHAUST GAS PURIFYING CATALYST COMPRISING THE SAME

TECHNICAL FIELD

The present invention relates to an oxygen storage/release material used in an exhaust gas purifying catalyst for purifying an exhaust gas from an internal combustion engine and the like, and an exhaust gas purifying catalyst comprising the same.

BACKGROUND ART

Conventionally, a three-way catalyst capable of simultaneously performing oxidation of carbon monoxide (CO) and hydrocarbon (HC) and reduction of nitrogen oxide ($NO_x$) has been used as the catalyst for purifying automotive exhaust gases. For example, catalysts obtained by supporting a noble metal such as platinum (Pt), rhodium (Rh) and palladium (Pd) on a porous oxide support such as alumina ($Al_2O_3$) are widely known. In order to simultaneously and effectively purify CO, HC and $NO_x$ by the activity of the three-way catalyst, it is important that the ratio between air and fuel (air-fuel ratio A/F) supplied to the automotive engine is controlled to the near theoretical air-fuel ratio (stoichiometric ratio).

However, the actual air-fuel ratio fluctuates to the rich (fuel rich atmosphere) side or the lean (fuel lean atmosphere) side centering on the stoichiometric ratio depending on the driving conditions or the like of an automobile and in turn, the exhaust gas atmosphere also fluctuates to the rich side or the lean side. For this reason, high purification performance cannot be necessarily ensured only by a three-way catalyst. In order to enhance the exhaust gas purifying ability of the three-way catalyst by absorbing the fluctuation of the oxygen concentration in the exhaust gas, a material having a so-called oxygen storage/release capacity of storing oxygen when the oxygen concentration in the exhaust gas is high and releasing oxygen when the oxygen concentration in the exhaust gas is low, is used in the exhaust gas purifying catalyst.

Regarding the oxygen storage/release material, for example, ceria ($CeO_2$) or a material based on ceria ($CeO_2$), such as ceria-zirconia ($CeO_2$—$ZrO_2$) composite oxide, is known and widely used in practice. However, in order to achieve stable purification of an exhaust gas, an oxygen storage/release material having a higher oxygen storage/release capacity has been demanded and studied.

Japanese Unexamined Patent Publication (Kokai) Nos. 2005-087892 (JPP'892) and 2006-075716 (JPP'716) describe an exhaust gas purifying catalyst comprising an oxygen storage/release material consisting of a rare earth oxysulfate or oxysulfide represented by $A_2O_2SO_4$ or $A_2O_2S$ (A is a rare earth element) and a noble metal supported thereon. More specifically, JPP'892 discloses Pt/$La_2O_2SO_4$ or Pt/$La_2O_2S$ in which the noble metal is platinum (Pt) and the rare earth element is lanthanum (La), and JPP'716 discloses the exhaust gas purifying catalyst in which the noble metal is palladium (Pd) and the rare earth element is lanthanum (La), praseodymium (Pr), neodymium (Nd) or samarium (Sm). In these patent publications, the exhaust gas purifying catalyst comprising an oxygen storage/release material consisting of a rare earth oxysulfate or oxysulfide and a noble metal supported thereon is found to have an oxygen storage/release capacity about 8 times higher than that of conventional exhaust gas purifying catalysts which comprise an oxygen storage/release material consisting of a $CeO_2$—$ZrO_2$ composite oxide and a noble metal supported thereon.

DISCLOSURE OF THE INVENTION

However, such an oxygen storage/release material consisting of a rare earth oxysulfate or oxysulfide has a problem in that the temperature allowing the material to exhibit the oxygen storage/release capacity is generally high compared to conventional oxygen storage/release materials consisting of a ceria ($CeO_2$)-based material, and the material does not act at low temperatures. JPP'716 describes that when palladium (Pd) as the noble metal is supported on an oxygen storage/release material consisting of a rare earth oxysulfate or oxysulfide, the temperature allowing the material to exhibit the oxygen storage/release capacity can be lowered. However, there is still room for improvement in lowering the temperature. Further, although JPP'892 and JPP'716 describe that the exhaust gas purifying catalyst comprising a rare earth oxysulfate or oxysulfide as a catalyst support have an effect on the oxygen release capacity in a hydrogen-containing gas, they do not describe nor suggest the effect on the oxygen release capacity in a CO-containing gas closer to the composition of the exhaust gas.

Accordingly, an object of the present invention is to provide an oxygen storage/release material using a rare earth oxysulfate or oxysulfide, which has a high oxygen storage/release capacity even at lower temperatures, and in particular, which has a high oxygen release capacity in a CO-containing gas, and an exhaust gas purifying catalyst comprising the same.

The present invention for attaining this object is as follows.

(1) An oxygen storage/release material, comprising a compound consisting of $Pr_2O_2SO_4$ and/or $Pr_2O_2S$ and at least one metal selected from the group consisting of Pt, Rh and Fe supported thereon.

(2) The oxygen storage/release material described in item (1), which has an oxygen release capacity in a CO-containing gas.

(3) An exhaust gas purifying catalyst, comprising the oxygen storage/release material described in item (1) or (2).

BRIEF DESCRIPTION OF DRAWINGS

FIG. 1 is a graph showing the oxygen storage/release initiation temperature regarding oxygen storage/release materials of Examples and Comparative Examples.

FIG. 2 is a graph showing the A/F fluctuation absorbing effect on oxygen storage/release materials of Examples and Comparative Examples.

BEST MODE FOR CARRYING OUT THE INVENTION

An oxygen storage/release material of the present invention comprises a compound consisting of $Pr_2O_2SO_4$ and/or $Pr_2O_2S$ and at least one metal selected from the group consisting of Pt, Rh and Fe supported thereon, and in particular, it has a high oxygen release capacity in a CO-containing gas.

The oxygen storage/release material generally stores or releases oxygen by a redox reaction resulting from a valence change of the element ion constituting the oxygen storage/release material. In conventional oxygen storage/release materials using a ceria-zirconia composite oxide (e.g., $(CeZr)O_2$), in a rich atmosphere, i.e., when the oxygen concentration in the exhaust gas is low, oxygen is released generally through a reaction represented by the following formula:

$$(CeZr)O_2 \rightarrow (CeZr)O_{1.5} + \tfrac{1}{4}O_2 \qquad (1)$$

On the other hand, in a lean atmosphere, i.e., when the oxygen concentration in the exhaust gas is high, oxygen is stored through a reverse reaction. Such a reversible redox reaction absorbs the fluctuation of the air-fuel ratio A/F in the exhaust gas, and promotes the purification of the exhaust gas. Compared to this, in the oxygen storage/release material using a rare earth oxysulfate ($A_2O_2SO_4$, wherein A is a rare earth element), oxygen is released by changing a rare earth oxysulfate to a rare earth oxysulfide through the following reaction:

$$A_2O_2SO_4 \rightarrow A_2O_2S + 2O_2 \quad (2)$$

i.e., a redox reaction of the sulfur element contained in the rare earth oxysulfate, and oxygen is stored through a reverse reaction.

As is clear from formulae (1) and (2), the oxygen storage/release material using a rare earth oxysulfate and/or oxysulfide theoretically has an oxygen storage/release capacity about 8 times higher than that of the conventional ceria-zirconia composite oxide. Accordingly, when an oxygen storage/release material consisting of a rare earth oxysulfate and/or oxysulfide having such a high oxygen storage/release capacity is used in an exhaust gas purifying catalyst, the catalyst is enhanced in the ability of absorbing the fluctuation of the air-fuel ratio (A/F) in an exhaust gas, as a result, the purification performance of the catalyst is enhanced.

According to the present invention, $Pr_2O_2SO_4$ and/or $Pr_2O_2S$ which are praseodymium oxysulfate and/or oxysulfide are used as the compound consisting of rare earth oxysulfate and/or oxysulfide.

$Pr_2O_2SO_4$ which is praseodymium oxysulfate may be prepared by any method known to a person skilled in the art. According to the present invention, $Pr_2O_2SO_4$ may be prepared, for example, by a method using a surfactant as a source of a sulfuric acid group moiety in $Pr_2O_2SO_4$. Specifically, $Pr_2O_2SO_4$ may be prepared by mixing a compound containing praseodymium as the cation, such as praseodymium nitrate, a basic solvent for hydroxylating it, such as aqueous ammonia, and a surfactant as a source of a sulfuric acid group moiety, such as sodium dodecylsulfate (SDS), at a predetermined concentration, and subjecting the obtained precipitate to washing, drying, pulverization, firing and the like.

The surfactant, such as sodium dodecylsulfate, used as a source of a sulfuric acid group moiety in $Pr_2O_2SO_4$ may be introduced into praseodymium nitrate of a raw material at a concentration sufficient to produce $Pr_2O_2SO_4$. Further, in a preparation method of $Pr_2O_2SO_4$ using such a surfactant, it is believed that not only the surfactant acts as a source of the sulfuric acid group, but also a carbon chain moiety thereof acts as an organic template. Therefore, since a precipitate obtained by mixing raw materials can have regular layers, $Pr_2O_2SO_4$ having a high surface area can be obtained by firing the precipitate to decompose and remove the organic template moiety.

The drying and firing of the precipitate may be performed at a temperature and for a time sufficient to decompose and remove the organic template moiety of the surfactant and obtain $Pr_2O_2SO_4$ having a high surface area. For example, the drying may be performed at room temperature under reduced pressure or at a temperature of 80 to 250° C. for 12 to 24 hours, and the firing may be performed at a temperature of 500 to 700° C. for 1 to 20 hours.

In another method, $Pr_2O_2SO_4$ may also be prepared by heating a sulfate of Pr, i.e., praseodymium sulfate octahydrate ($Pr_2(SO_4)_3 \cdot 8H_2O$), at a temperature of 800° C. or more in air to decompose a part of the sulfuric acid group. In this case, the temperature when heating the sulfate of Pr may be 800° C. or more, and may be suitably set within the range resulting in the partial decomposition of the sulfuric acid group, as described above.

According to the oxygen storage/release material of the present invention, when $Pr_2O_2SO_4$ is used as a compound consisting of a rare earth oxysulfate, and an appropriate metal is further supported on the compound, the temperature region in which the material exhibits the oxygen storage/release capacity can be greatly extended to the lower temperature side.

The rare earth oxysulfate releases oxygen in a reducing atmosphere and changes to a rare earth oxysulfide. On the other hand, in an oxidation atmosphere, this rare earth oxysulfide stores oxygen and changes to a rare earth oxysulfate. That is, oxygen is stored or released by a redox reaction occurring between oxysulfate and oxysulfide of a rare earth. Such a reaction reversibly proceeds, so that the rare earth oxysulfate and/or oxysulfide can exert the oxygen storage/release capacity depending on the ambient atmosphere. However, the rare earth oxysulfate and/or oxysulfide generally have an oxygen storage/release capacity only in a temperature range higher than 600 to 700° C., although this may vary depending on other various conditions such as the rare earth element used and the composition or concentration of the ambient atmosphere gas. $Pr_2O_2SO_4$ and/or $Pr_2O_2S$ using praseodymium (Pr) as the rare earth element also have an oxygen storage/release capacity generally in a temperature range higher than 600 to 700° C. Therefore, in the case of an exhaust gas purifying catalyst using an oxygen storage/release material consisting of such a material, the exhaust gas purifying performance at a low temperature becomes lower than that at a high temperature. According to the present invention, a specific metal is supported on $Pr_2O_2SO_4$ and/or $Pr_2O_2S$, so that oxygen can be stored or released in a temperature range lower than 600° C., in particular, a high oxygen release capacity can be obtained in a CO-containing gas, and furthermore, a high activity of absorbing the air-fuel ratio fluctuation can be exhibited even at a low temperature of 600° C.

According to the present invention, the metal which is supported on $Pr_2O_2SO_4$ and/or $Pr_2O_2S$ may include platinum (Pt), rhodium (Rh), iron (Fe) or a combination thereof. In particular, in the case where Fe of a base metal is used as a metal to be supported, the production cost of the oxygen storage/release material can be kept low, unlike a noble metal such as Pt and Rh.

The supporting of the metal on $Pr_2O_2SO_4$ may be performed by any method known to a person skilled in the art.

For example, the metal may be supported by a method where a compound containing the above-described metal as the cation is used as a metal source and $Pr_2O_2SO_4$ is dipped in a solution of the compound at a predetermined concentration and then, subjected to drying, firing and the like, or a method where a complex of the above-described metal is used as a metal source and $Pr_2O_2SO_4$ is dipped in a solution of the complex at a predetermined concentration and then, subjected to drying, firing and the like. The metal may be supported on $Pr_2O_2SO_4$ in a supporting amount of generally from 0.25 to 20 wt %.

The drying and firing of $Pr_2O_2SO_4$ dipped in a solution containing a compound or complex of the metal can be performed at a temperature and for a time sufficient to support the metal on $Pr_2O_2SO_4$. For example, the drying may be performed at a temperature of 80 to 250° C. for 12 to 24 hours, and the firing may be performed at a temperature of 400 to 500° C. for 2 to 10 hours.

The oxygen storage/release material of the present invention can be used in an exhaust gas purifying catalyst. In particular, an oxygen storage/release material of the present invention on which Fe as the metal is supported can be used as an exhaust gas purifying catalyst by further supporting a noble metal such as Pt, Rh or Pd as an active ingredient. The noble metal may be supported in the same manner as the above-described metal supporting method. The exhaust gas purifying catalyst may be used, for example, by compressing the fired powder of metal-supported material and pulverizing it into a pellet form, or by adding a predetermined binder to the fired powder of metal-supported material to form a slurry and coating the slurry on a catalyst substrate such as a cordierite-made honeycomb substrate.

EXAMPLES

The present invention is described in detail below based on Examples, but the present invention is not limited thereto.

In the following Examples, oxygen storage/release materials were prepared by supporting various metals on a compound consisting of $Pr_2O_2SO_4$, and the prepared oxygen storage/release materials were examined for the oxygen storage/release initiation temperature and the effect of absorbing air-fuel ratio (A/F) fluctuation.

Praseodymium oxysulfate $Pr_2O_2SO_4$ used in Examples and Comparative Examples was prepared as follows. First, praseodymium nitrate hexahydrate ($Pr(NO_3)_3 \cdot 6H_2O$), sodium dodecylsulfate (SDS) as a source of a sulfuric acid group moiety, ammonia and water were introduced into a flask at a molar ratio of 1:2:30:60. Then, the flask was placed in an oil bath at 40° C., and the contents were stirred by a stirrer at a rotational speed of 350 rpm for 1 hour in an atmosphere open system. Subsequently, the temperature was elevated to 60° C. before stirring for 9 hours, and the system was cooled to room temperature (pH=about 11). The obtained precipitate was separated by centrifugal separation, washed several times with distilled water and then dried under reduced pressure at room temperature. The dried sample was pulverized into a powder form and then fired in a draft at a temperature of 500° C. or more for 5 hours to obtain praseodymium oxysulfate $Pr_2O_2SO_4$.

Example 1

In this Example, an oxygen storage/release material of $Pt/Pr_2O_2SO_4$ was prepared by supporting platinum (Pt) on the compound consisting of praseodymium oxysulfate $Pr_2O_2SO_4$ prepared above. First, 1 mL of a nitrate solution of platinum (Pt) was prepared at a concentration giving a Pt supporting amount of 1 wt % per 0.4 g of $Pr_2O_2SO_4$. Then, about 0.4 g of the $Pr_2O_2SO_4$ powder prepared above was charged into a crucible, and the crucible was placed on a hotting stirrer and set to a temperature allowing the nitrate solution of platinum (Pt) to dry. When the crucible became hot, the nitrate solution of platinum (Pt) was added dropwise little by little while drying it. After the completion of the dropwise addition, the sample was left standing at room temperature for about 1 hour and dried overnight at a temperature of 120° C. in a dryer. The dried sample was lightly loosened and then fired in air at 400° C. for 2 hours to obtain Oxygen Storage/Release Material A of $Pt/Pr_2O_2SO_4$.

Example 2

Oxygen Storage/Release Material B of $Rh/Pr_2O_2SO_4$ was obtained in the same manner as in Example 1, except that a nitrate solution of rhodium (Rh) was used in place of the nitrate solution of platinum (Pt).

Example 3

Oxygen Storage/Release Material C of $Fe/Pr_2O_2SO_4$ was obtained in the same manner as in Example 1, except that a nitrate solution of iron (Fe) was used in place of the nitrate solution of platinum (Pt).

Comparative Example 1

Oxygen Storage/Release Material D of $Pd/Pr_2O_2SO_4$ was obtained in the same manner as in Example 1, except that a nitrate solution of palladium (Pd) was used in place of the nitrate solution of platinum (Pt).

Comparative Example 2

Oxygen Storage/Release Material E of $Ni/Pr_2O_2SO_4$ was obtained in the same manner as in Example 1, except that a nitrate solution of nickel (Ni) was used in place of the nitrate solution of platinum (Pt).

Comparative Example 3

In this Example, $Pr_2O_2SO_4$ was used directly as Oxygen Storage/Release Material F without supporting a metal thereon.

The oxygen storage/release performance of Oxygen Storage/Release Materials A to F prepared above were evaluated by a portable air-fuel ratio analyzer (MEXA-700λ) manufactured by HORIBA. Test pieces used in the evaluation of the oxygen storage/release performance were prepared by mixing each of Oxygen Storage/Release Materials A to F prepared above with alumina ($Al_2O_3$) at a mass ratio of 100:26 to prepare a slurry, and coating the slurry on a cordierite-made honeycomb substrate (φ 30 mm, L 50 mm, wall thickness: 4 mil, 400 cells) produced by NGK in an amount of 10 g in terms of the dry mass by a wash coating method.

The A/F value in the temperature rising process was measured while switching test gases of 3% $CO/N_2$ balance and 10% $O_2/N_2$ balance every one minute at a flow rate of 10 L/min, i.e., oscillating the air-fuel ratio A/F value between a rich atmosphere of about 13.6 and a lean atmosphere of about 15.6 every one minute. The results are shown in FIGS. 1 and 2.

FIG. 1 is a graph showing the oxygen storage/release initiation temperature regarding oxygen storage/release materials of the Examples and Comparative Examples. Incidentally, the oxygen storage/release initiation temperature is assigned to a point at which the temperature of the catalyst bed starts fluctuating along with the storage or release of oxygen. As is clear from FIG. 1, in the oxygen storage/release material of Comparative Example 3 on which a metal was not supported, the oxygen storage/release initiation temperature was about 760° C. However, it was greatly lowered to 600° C. or less by supporting a metal, Furthermore, the oxygen storage/release materials of Comparative Examples 1 and 2 showed the oxygen storage/release initiation temperature of about 600° C., whereas the oxygen storage/release materials of Examples 1 to 3 showed the oxygen storage/release capacity at a temperature lower than 570° C., in particular, the oxygen storage/release materials of Examples 2 and 3 having Rh and Fe, respectively, supported thereon showed the oxygen storage/release capacity at a low temperature of about 550° C.

FIG. 2 is a graph showing the A/F fluctuation absorbing effect on oxygen storage/release materials of Examples and Comparative Examples. In FIG. 2, regarding oxygen storage/release materials of Examples and Comparative Examples, the difference between the maximum value and the minimum value of the air-fuel ratio A/F at 600° C. is shown as ΔA/F. Since the A/F value is oscillated between about 13.6 and about 15.6, the ΔA/F value is 2.0 when the fluctuation absorbing effect by the oxygen storage/release material is not obtained. As is clear from FIG. 2, in the oxygen storage/release material of Comparative Example 3 on which a metal was not supported, the ΔA/F value was about 1.8. Therefore, the oxygen storage/release materials of $Pr_2O_2SO_4$ and/or $Pr_2O_2S$ not having a metal supported thereon had little effect on absorbing the A/F fluctuation at a low temperature of 600° C. On the other hand, in the oxygen storage/release materials of Examples 1 to 3 and Comparative Examples 1 and 2 having a metal supported thereon, the ΔA/F values were decreased. Furthermore, the oxygen storage/release materials of Comparative Examples 1 and 2 had the ΔA/F values of around 1.5, whereas the oxygen storage/release materials of Examples 1 to 3 had the values lower than 1.0.

As seen from FIGS. 1 and 2, in the oxygen storage/release material of the present invention, the storage or release of oxygen can be initiated at a temperature much lower than 600° C. in a CO-containing gas atmosphere closer to the exhaust gas conditions, and the air-fuel ratio A/F fluctuation can be remarkably suppressed even at a low temperature of 600° C.

Industrial Applicability

According to the present invention, supporting a specific metal on a compound consisting of praseodymium (Pr) oxysulfate or oxysulfide ($Pr_2O_2SO_4$ or $Pr_2O_2S$) can give an oxygen storage/release material in which the temperature region, in which the material exhibits the oxygen storage/release capacity, is greatly extended to the lower temperature side, and in particular, which has a high oxygen release capacity in a CO-containing gas, as compared to materials not having a metal supported thereon or conventional materials having palladium (Pd) supported thereon. Furthermore, according to the exhaust gas purifying catalyst comprising the oxygen storage/release material of the present invention, the fluctuation of the air-fuel ratio (A/F) in an exhaust gas can be significantly suppressed even at a low temperature of 600° C., so that purification of an exhaust gas can be achieved in a state closer to an optimal A/F value and the exhaust gas purifying performance of the exhaust gas purifying catalyst can be remarkably enhanced.

The invention claimed is:

1. An oxygen storage/release material, comprising a compound consisting of $Pr_2O_2SO_4$ and/or $Pr_2O_2S$ and Fe supported thereon.

2. An exhaust gas purifying catalyst, comprising the oxygen storage/release material according to claim 1.

* * * * *